W. PFLEIDERER.
REFRIGERATING AND ICE MAKING APPARATUS.
APPLICATION FILED MAY 17, 1915.

1,169,675.

Patented Jan. 25, 1916.
2 SHEETS—SHEET 1.

Inventor
Walter Pfleiderer,
Mason Fenwick & Lawrence
Attorneys

W. PFLEIDERER.
REFRIGERATING AND ICE MAKING APPARATUS.
APPLICATION FILED MAY 17, 1915.

1,169,675.

Patented Jan. 25, 1916.
2 SHEETS—SHEET 2.

Inventor:
Walter Pfleiderer,
Attorneys.

ced. # UNITED STATES PATENT OFFICE.

WALTER PFLEIDERER, OF LONDON, ENGLAND.

REFRIGERATING AND ICE-MAKING APPARATUS.

1,169,675.

Specification of Letters Patent. Patented Jan. 25, 1916.

Application filed May 17, 1915. Serial No. 28,784.

*To all whom it may concern:*

Be it known that I, WALTER PFLEIDERER, a subject of the King of Great Britain and Ireland, and residing at Kingsway House, Kingsway, London, W. C., England, engineer, have invented certain new and useful Improvements in Refrigerating and Ice-Making Apparatus, of which the following is a specification.

This invention relates to improvements in refrigerating and ice-making apparatus of the absorption type, its object being to devise a form of apparatus which shall be cheap to construct while at the same time being simple and efficient in its operation.

The invention consists in refrigerating and ice-making apparatus of the type referred to comprising in combination a generating vessel and a refrigerating vessel communicating with one another by a pipe or the like, a fixed cooling tank and means for mechanically reversing the positions of the two vessels so that it may be alternately immersed in the cooling tank.

The invention also consists in other details and arrangements hereinafter more particularly referred to.

The accompanying drawings illustrate one mode of carrying out the invention.

Figure 1:
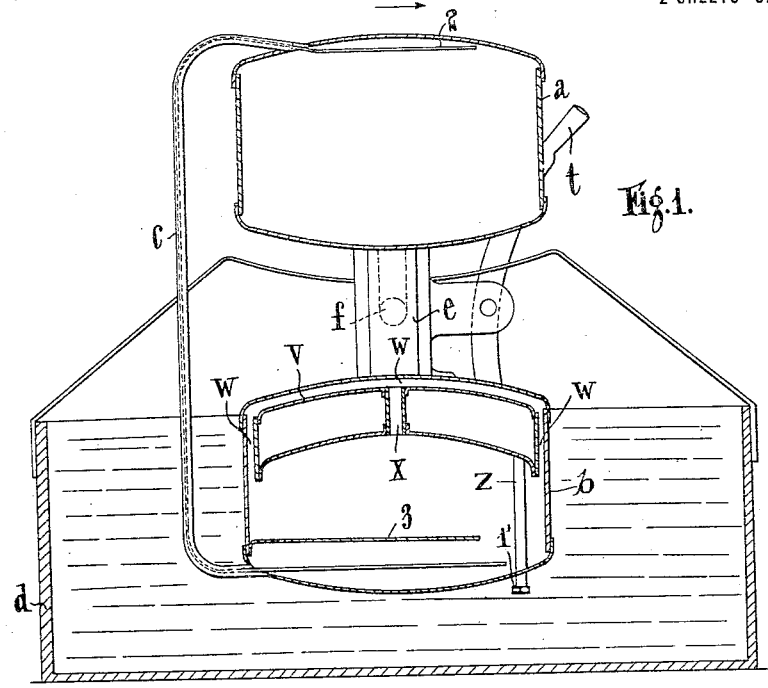
Figure 3:
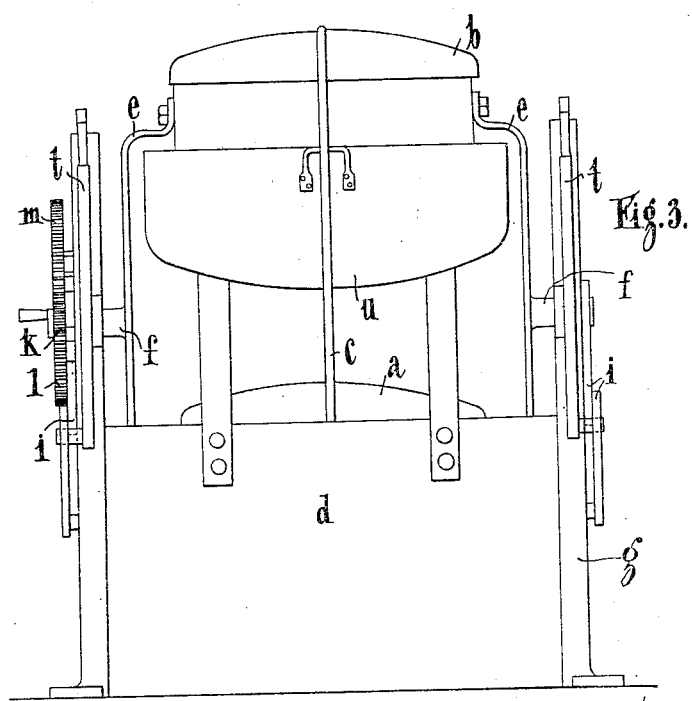
Figure 2:
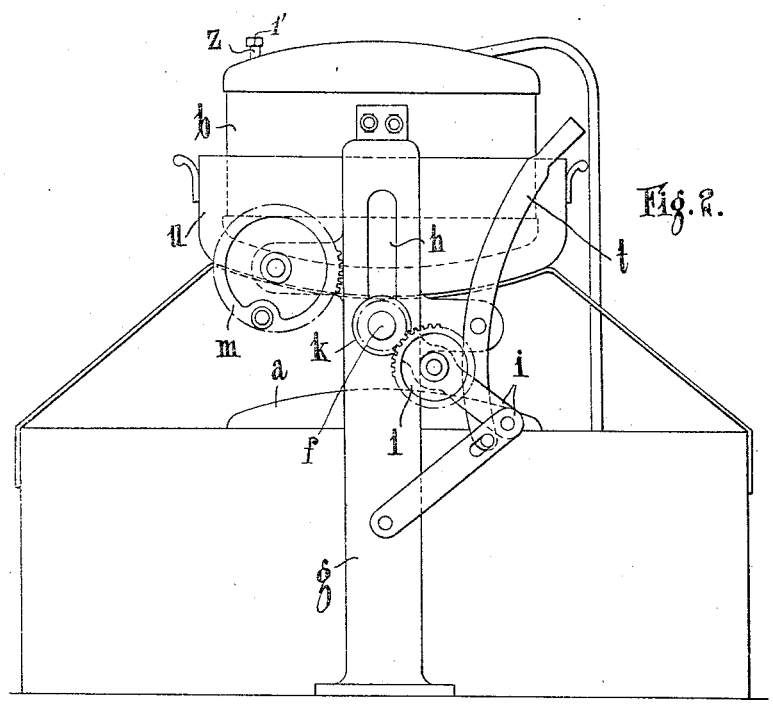
Figure 4:
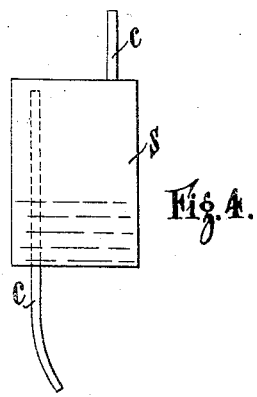

Figure 1 is a side sectional elevation showing one convenient form of apparatus constructed in accordance with the invention and in the position which it occupies during the initial stage of the operation of the machine. Fig. 2 is a side elevation showing the apparatus in the position which it occupies in the second stage of the operation. Fig. 3 is a front elevation of the apparatus in the position of Fig. 2. Fig. 4 is a fragmentary view illustrating a detail which may be employed in connection with the apparatus.

In carrying my invention into effect in one convenient manner as, for example, in its application to refrigerating apparatus of the ammonia absorption type, I provide two cylinders or vessels, one of which *a* (hereinafter referred to as "the heating vessel") is arranged initially at a higher level than the second vessel *b* (hereinafter referred to as "the refrigerating vessel") and may be provided, if desired, with any suitable form of anti-priming device.

The two vessels are connected by a suitable pipe connection *c*, one end of which is situated near the upper part of the heating vessel while the other end opens into the lower part of the refrigerating vessel when these two vessels are in their initial position as illustrated in Fig. 1.

A cooling tank *d* is provided in connection with the apparatus and suitable means are adopted whereby the apparatus may be rotated or moved in such a manner that when required the heating vessel *a* may take the place of the refrigerating vessel *b* in the cooling tank *d* so that the apparatus occupies the position shown in Fig. 2.

In one convenient method of providing for this reversal of the apparatus I connect the vessels *a* and *b* by suitable straps or like binding means *e* each of which is provided with a trunnion *f*, the trunnions being mounted in bearings carried by suitable pillars or standards *g* or other convenient framework provided in connection with the apparatus.

The cooling tank *d* is of such a size that the apparatus can be rotated so that either vessel may be immersed in the cooling tank, or where it is desired to reduce the dimensions of the latter as much as possible suitable means are provided for removing either vessel from the tank before the apparatus as a whole is rotated so that the apparatus during its rotation shall not foul the edge of the tank. Thus, in the construction shown the trunnion carrying bearings are slidably mounted in the standards *g* by means of the slots *h* so that the bearings and with them the whole apparatus may be raised or lowered by means of the toggle link mechanism *i* operated by suitable levers *t* as may be required for removing either receptacle or vessel from the cooling tank before the rotation of the apparatus is performed, and for subsequently immersing the required vessel in the cooling tank after the rotation.

One trunnion has mounted thereon a spur wheel *k* which is in engagement with an idle pinion *l* carried by the toggle link mechanism *i*, the pinion being adapted when the apparatus is raised by depression of the levers *t*, to engage with a pinion *m* which may then be rotated by any suitable means in such a manner as to rotate the apparatus in the direction shown by the arrow in Fig. 1. It will be clear, however, that any suitable form of cam mechanism or its equivalent may be adopted for the purpose, or the apparatus may be arranged to have a rotational movement in two directions at right angles to one another, or any other suitable means may be employed for providing for the rotation of the apparatus so that either vessel may be immersed when required in the one cooling tank.

Fig. 4 is a view illustrating an arrangement that may be employed for still further safeguarding against the possibility of liquid absorbent being carried by the gas from the heating vessel into the refrigerating vessel and which consists of a tank or trap *s* interposed at a convenient level in the connecting pipe *c*.

The operation of the apparatus is as follows:—With the vessels in the position shown in Fig. 1, the heating vessel *a* is filled to any desired level with the ammonia solution and the vessel heated by a gas or oil burner, steam-pipe or other suitable means whereupon the gas evolved passes from the heating vessel through the pipe *t* and is condensed within the refrigerating vessel *b* which is within the cooling tank so that at the end of the first operation the refrigerating vessel *b* contains liquid anhydrous ammonia while the heating vessel contains water or weak liquor or other absorbent medium. The heating medium is now removed from the heating vessel and the position of the vessels reversed in the manner above described so that the parts take the position shown in Fig. 2 in which the heating vessel is now immersed within the cooling tank, and where the apparatus is required for ice-making the refrigerating vessel is placed in an ice-mold *u* which may be placed in position before the apparatus is lowered after reversal. In this position it is to be noted that the connecting pipe *c* now has one end situated near the top of the refrigerating vessel and the other end near the bottom of the heating vessel and beneath the level of the absorbent contained therein. The cooling of the vessel *a* causes a reduction of pressure in the apparatus so that the liquid anhydrous ammonia within the refrigerating vessel evaporates and the gas passes through the pipe *c* into the absorbent medium within the heating vessel through which it is forced to bubble by reason of the outlet from the pipe being situated beneath the level of the absorbent.

Where the apparatus is required for ice-making as in the example illustrated, there might be a tendency for the ice to form unevenly within the ice-mold on account of the lowering of the level of the liquid anhydrous ammonia within the refrigerating vessel due to the evaporation, and for the purpose of insuring that the formation shall be uniform I prefer to provide within the refrigerating vessel a hollow or other drum *v* conforming to the shape of the refrigerating vessel so as to leave a space *w* between the drum and the refrigerating vessel in which space the evaporation progressively takes place, the evaporated liquid being replaced by fresh liquid from above the drum through the aperture *x* provided therein. I may provide a pipe *z* communicating with the interior of the drum and adapted to be closed by a plug or screw-cap *l'*, and this pipe performs the useful function of enabling hot water or other heating medium to be introduced within the drum so as to facilitate the removal of the ice from the exterior of the refrigerating vessel.

Notwithstanding the precautions that may be taken to prevent absorbent liquor from being carried over into the refrigerating vessel some may yet find its way thereinto, and for this reason I prefer to provide the apparatus with simple means whereby any liquor that collects in the refrigerating vessel may be readily and rapidly returned to the heating vessel. For this purpose I provide the refrigerating vessel at its lower part with a plate or diaphragm 3 extending from one wall of the refrigerating vessel nearly to the opposite wall in one direction and entirely between the two walls in the transverse direction so as to form as it were a pocket at the lower part of the refrigerating vessel in which any liquor collected therein is trapped if for this purpose the apparatus be rotated in a direction opposite to that shown by the arrow in Fig. 1, and as the pipe *c* is connected to the lowest point of this pocket all liquid therein passes during the continued rotation of the apparatus, through the pipe *c* and into the heating vessel, and to facilitate the return of this liquid through the pipe *c* I prefer to provide a pipe 2, establishing communication between both vessels and of sufficient length that when the pipe *c* is in its horizontal position the upper part of the equalizing pipe 2 is above the level of the liquid within the pocket formed by the plate 3.

The foregoing is a description giving broadly the nature of the invention, and it will be understood that the details of construction and the arrangement of the various parts may be suitably modified as may be found necessary to give the best results under any practical conditions that the invention may be called upon to meet.

Having now described my invention what I claim as new and desire to secure by Letters Patent is:—

1. Refrigerating and ice-making apparatus comprising a cooling tank, standards rising alongside the same and having upright slots, a generating vessel and a refrigerating vessel, a framework connecting said vessels and having trunnions projecting through said slots, toggle link mechanisms connecting the extremities of said trunnions with the standards, and levers for actuating said mechanisms to raise the trunnions in the slots and permit their rotation so that said vessels may be alternately immersed in said cooling tank.

2. Refrigerating and ice-making apparatus comprising a cooling tank, standards rising alongside the same and having upright slots, a generating vessel and a refrigerating vessel, a framework connecting said vessels and having trunnions projecting through said slots, toggle link mechanism connecting the extremities of said trunnions with the standards, a spur wheel fast on one of said trunnions, a pinion fast on the link connected therewith and engaging the spur wheel, a driving pinion with which said pinion is adapted to be engaged, and means for actuating said toggle link mechanism, for the purpose set forth.

3. Refrigerating and ice-making apparatus comprising in combination a generating vessel, a refrigerating vessel, a pipe connection between said vessels, a cooling tank, means for mechanically reversing the positions of said vessels so that they may be alternately immersed in the cooling tank, and a hollow drum disposed within and of smaller dimensions than but conforming in shape with the refrigerating vessel, said drum having an aperture through it, for the purpose set forth.

4. Refrigerating and ice-making apparatus comprising in combination a generating vessel, a refrigerating vessel, a pipe connection between said vessels, a cooling tank, means for mechanically reversing the positions of said vessels so that they may be alternately immersed in the cooling tank, a hollow drum of smaller dimensions than but conforming in shape to the refrigerating vessel placed interiorly thereof and a pipe extending from the interior of said hollow drum to the exterior of the refrigerating vessel.

5. Refrigerating and ice-making apparatus comprising a generating vessel and a refrigerating vessel arranged one above the other, a pipe connection between said vessels, a framework supporting said vessels and having trunnions, standards having slots into which said trunnions project, a cooling tank and means for raising and then rotating said trunnions and framework so that said vessels may be alternately immersed in said cooling tank.

6. Refrigerating and ice-making apparatus comprising a generating vessel and a refrigerating vessel arranged one above the other, a pipe connection between said vessels, a cooling tank, means for rotating said vessels so that they may be immersed alternately in said cooling tank and means for withdrawing either vessel from the cooling tank before the apparatus as a whole is rotated.

In testimony whereof I have signed my name to this specification in the presence of two subscribing witnesses.

WALTER PFLEIDERER.

Witnesses:
  H. H. MATTHEWS,
  P. E. RICHARD.